F. WESTERMAN.

DEPOSITING MACHINE.

Reissued Oct. 19, 1915. APPLICATION FILED JUNE 1, 1915.

13,999.

5 SHEETS—SHEET 1.

Witness:
Louis M. Coldwell

Inventor:
Frederick Westerman
By: Pierce, Fisher & Clapp
Attys.

F. WESTERMAN.

DEPOSITING MACHINE.

APPLICATION FILED JUNE 1, 1915.

Reissued Oct. 19, 1915.

13,999.

5 SHEETS—SHEET 2.

Witness:-

Inventor:-

Frederick Westerman

By:- Pierce, Fisher & Clapp

Attys:-

F. WESTERMAN.

DEPOSITING MACHINE.

APPLICATION FILED JUNE 1, 1915.

Reissued Oct. 19, 1915.

13,999.

5 SHEETS—SHEET 3.

Witness:-
Chas. H. S. Whitehead

Inventor:
Frederick Westerman
By Pierce, Fisher & Clapp
Attys.

F. WESTERMAN.

DEPOSITING MACHINE.

APPLICATION FILED JUNE 1, 1915.

Reissued Oct. 19, 1915.

13,999.

5 SHEETS—SHEET 4.

Witness:-
Louis G. Hirschhead

Inventor:-
Frederick Westerman
By:- Pierce, Fisher & Chaffee
Attys.

F. WESTERMAN.

DEPOSITING MACHINE.

APPLICATION FILED JUNE 1, 1915.

Reissued Oct. 19, 1915.

13,999.

5 SHEETS—SHEET 5.

Witness:-

Louis M. Kleinhenz

Inventor:

Frederick Westerman

By:- Pierce, Richer & Clafin Attys.

UNITED STATES PATENT OFFICE.

FREDERICK WESTERMAN, OF CHICAGO, ILLINOIS.

DEPOSITING-MACHINE.

13,999. Specification of Reissued Letters Patent. Reissued Oct. 19, 1915.

Original No. 1,121,430, dated December 15, 1914, Serial No. 630,268. Application for reissue filed June 1, 1915. Serial No. 31,638.

*To all whom it may concern:*

Be it known that I, FREDERICK WESTERMAN, a citizen of the United States, and a resident of Chicago, county of Cook, and State of Illinois, have invented certain new and useful Improvements in Depositing-Machines, of which the following is declared to be a full, clear, and exact description.

The invention relates to depositing machines and more particularly to machines for depositing marshmallow, frosting or similar substance on cakes or the like, and seeks to provide improved means for feeding the cakes to the depositing mechanism and for lowering and advancing the cakes or wafers after the marshmallow or similar substance is applied thereto.

The invention consists in the features of improvement hereinafter described, illustrated in the preferred form in the accompanying drawings and more particularly pointed out in the appended claims.

Figure 1:
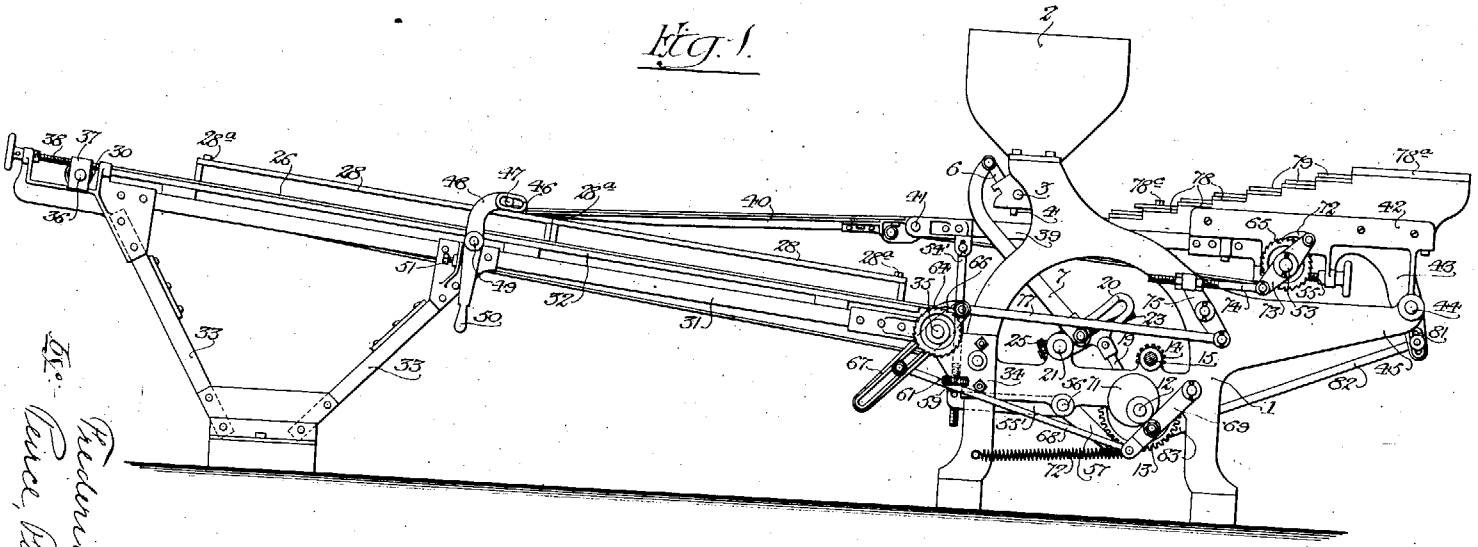
Figure 2:
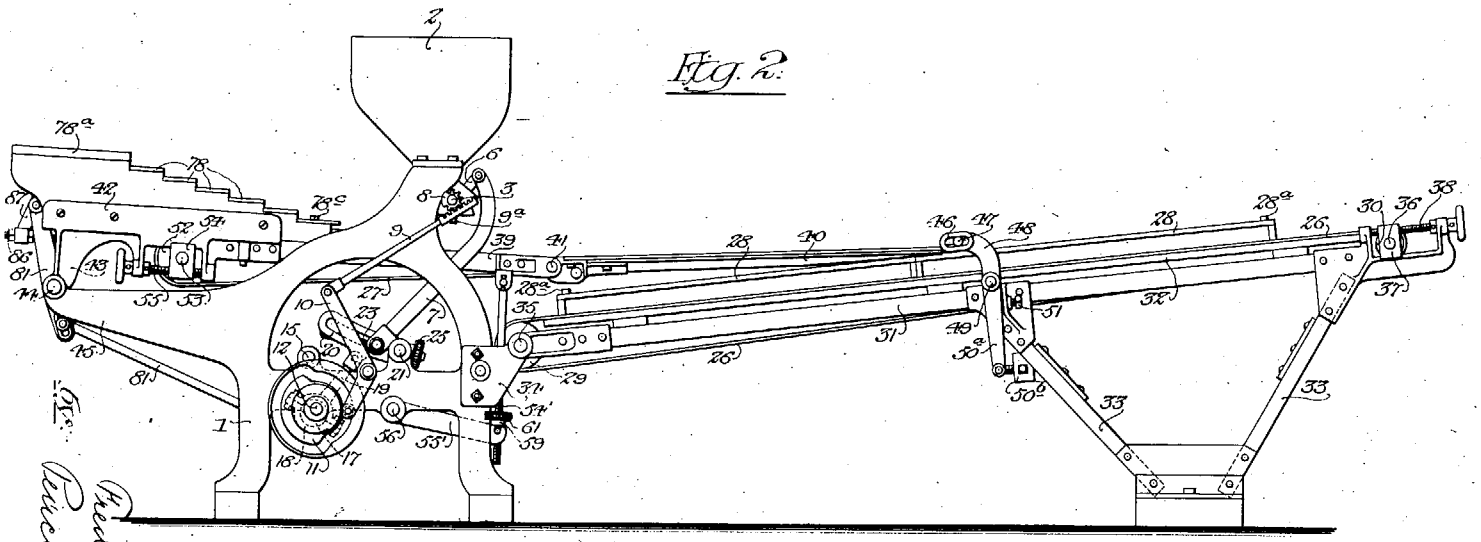
Figure 3:
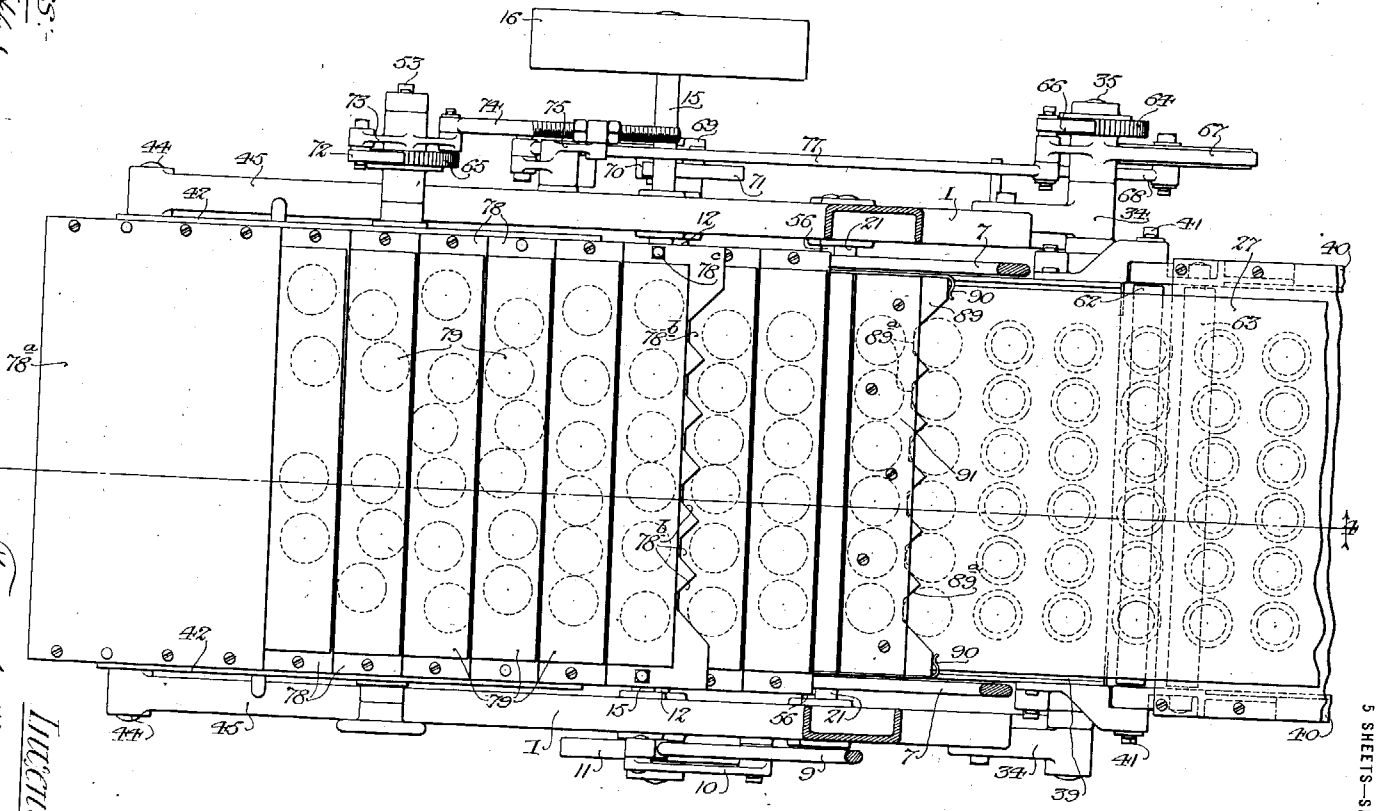
Figure 4:
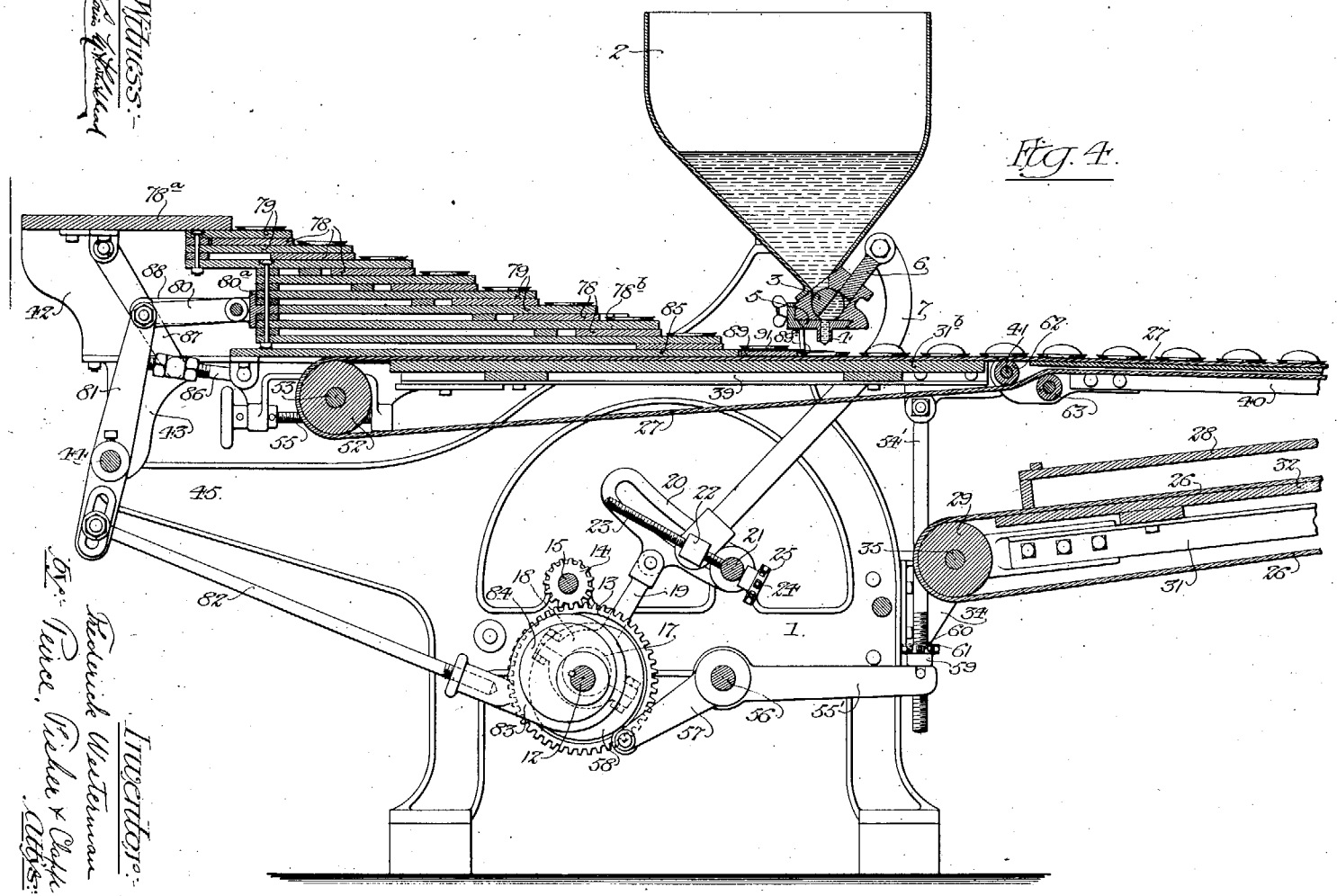
Figure 6:
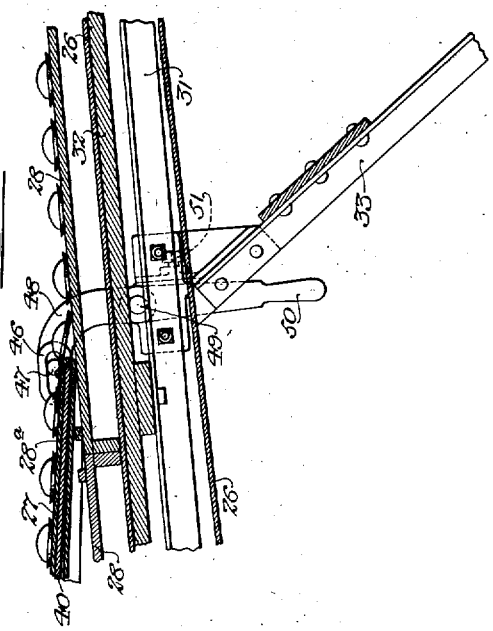
Figure 5:
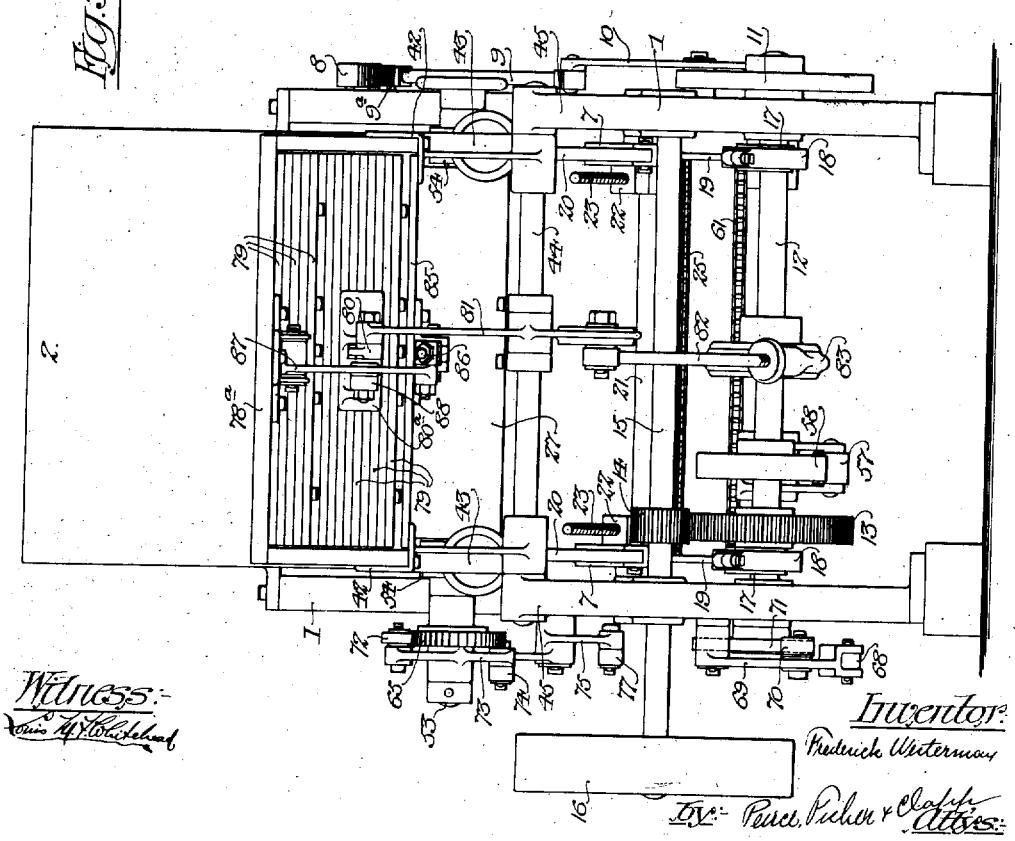

In the drawings, Figure 1 is an elevation of one side of the improved machine. Fig. 2 is an elevation of the opposite side. Fig. 3 is a plan view. Fig. 4 is a section on the line 4—4 of Fig. 3. Fig. 5 is a rear elevation and Fig. 6 is a detail view in vertical section of portions of the traveling carriers for the cakes.

The main frame of the machine comprises cast metal side portions 1. The depositing mechanism is carried between the upper ends of the side frames 1 and comprises a tank 2 in which marshmallow or similar coating substance is placed.

A half cylindrical, rotary measuring valve 3 is arranged transversely in the lower portion of the tank 2 above a series of orifices through which the marshmallow is discharged. In the construction shown, there is a row of such discharge orifices or nozzles 4 arranged in a removable plate 5. When the valve 3 is in the position shown in Fig. 4, the marshmallow removed from the body of the material in the tank is forced out by a piston or plunger 6.

A pinion 8 (see Fig. 2), is mounted upon one end of the measuring valve and is engaged by the teeth of a rack bar 9. This rack bar rests on a lug $9^a$ and is pivotally connected, at its opposite end, to the upper end of a lever arm 10. This arm is pivoted to the adjacent side frame 1 and is operated by a cam 11 on a transverse shaft 12 that is journaled in the side frames of the machine. By this means, the rack bar 9 is reciprocated to oscillate the measuring valve 3 and thereby remove portions of the material from the tank.

The shaft 12 is driven through the medium of a gear wheel 13 thereon (see Fig. 4) which meshes with the teeth of a pinion 14 on a transverse main driving shaft 15. Shaft 15 is journaled in the side frames above the shaft 12 and is provided at one end with a pulley 16 or other suitable driving means.

Two eccentrics 17 fixed on shaft 12 are provided with eccentric straps 18 and rods 19, the latter being connected to a pair of arms 20 on a cross shaft 21.

Pivot blocks 22 are mounted in segmental slots in the arms 20 and are adjusted by two screw rods 23 that extend through the shaft 21 and are provided with sprocket wheels 24 on their ends. The screw rods can be rotated in unison by a chain 25 passing over the sprocket wheels 24 to thereby adjust the blocks 22 on the arms 20. Arms 7 are connected to the pivot blocks 22 at their lower ends and at their upper ends are connected to the ends of the piston 6. By the mechanism described, the piston or plunger 6 is reciprocated at proper intervals to eject the material through the orifices or nozzles 4. By adjusting the pivot blocks the throw of the arms 7 and of the piston 6 can be regulated to eject the desired amount of material through the discharge orifices.

Two endless carrier bands 26 and 27 are provided for moving and discharging the cakes. The carrier band 27 extends substantially horizontally beneath the depositing mechanism and the band 26 extends beneath and beyond the discharge end of the carrier band 27. The second carrier is adapted to move a series of drying boards or trays 28 onto which the coated cakes are placed by the traveling carrier band 27. The carrier band 26 passes over rollers 29 and 30 which are mounted at the ends of an inclined, fixed carrier frame arranged beneath the discharge end of the carrier 27 and comprising side bars 31 and a transverse plate or board 32 over which the upper portion of the traveling band or belt passes. The side bars 31 are supported at their outer ends upon inclined brace bars 33 and at their inner ends are connected to two lugs 34 on the side frames 1 by a cross shaft 35. The cross shaft 35 also carries the roller 29. The roller 30 at the outer end of the traveling carrier is mounted upon a shaft 36 journaled in blocks 37. These blocks are slidably mounted in suitable guide-ways at the outer end of the carrier frame and can be adjusted to tighten the carrier belt or band by screws 38.

The traveling carrier belt or band 27 is mounted upon a buckling frame formed of two longitudinal sections or beds 39 and 40 which are parallel to and support the upper portion of the carrier band and which are hinged or pivotally connected together at their inner adjacent ends by a cross shaft 41. The carrier frame section 39 is provided at its outer end with a pair of brackets 42 having depending lugs 43 that pivotally engage a cross shaft 44. This shaft is mounted on two rearwardly projecting bracket arms 45 on the side frames 1. The outer end of the carrier frame section 40 is provided with a pair of longitudinally slotted lugs 46 which are engaged by pins 47 on the upper bent ends of a pair of supporting levers or arms 48. These arms are mounted on a cross shaft 49 which is journaled on the side bars 31 of the second carrier frame. These arms are provided with depending extensions 50 and 50[a] which normally abut against adjustable stop screws 51. The belt or band 27 passes over the narrow outer end of the frame section or bed 40 and is normally held by the arms 48 closely adjacent the upper surfaces of the drying boards or trays 28 on the traveling belt or carrier 26, so that the coated cakes are deposited upon the drying boards or trays, as most clearly shown in Fig. 6. These boards or trays are provided at their ends with spacing ribs 28[a], so that the boards or trays can be conveniently stacked. By means of the extension handle 50, the outer end of the upper carrier can be lifted to permit the ribbed ends of the trays to pass beneath it. The other extension 50[a] is provided with a counterweight 50[b] (see Fig. 2) which partially balances the weight of the part 40 so that it can be easily lifted. It should also be noted that the narrow, outer end of the carrier frame section 40, over which the cakes are delivered by the carrier band 27, is free to rise and fall to pass over any irregularities on the upper surface of the drying trays 28. In this way, the discharge end of the carrier will always be maintained closely adjacent the surface of the driving trays to properly deliver the cakes thereto.

At its rear end the belt 27 passes over a roller 52 mounted on a cross shaft 53. This shaft is journaled at its ends in blocks 54 which are mounted on adjusting screws 55, carried by the brackets 42. By adjusting these blocks the proper amount of tension can be placed upon the traveling belt or band 27.

The inner ends of the frame sections 39 and 40 of the buckling carrier are supported by two upright arms or rods 54′ which are pivotally connected at their upper ends to the inner end of the frame section or bed 39 which extends beneath the depositing device and, at their lower ends the arms 54′ engage a pair of arms 55′ which are mounted upon a cross shaft 56. An arm 57 on this shaft is arranged to engage a cam 58 on the shaft 12. By the means described the inner adjacent ends of the carrier frame sections are raised and lowered at proper intervals. The connection between the rods 54′ and arms 55′ are preferably adjustable and for this purpose the lower ends of the rods are threaded through two blocks 59 which are supported on the arms 55′. These blocks are provided with sprocket teeth 60 over which a chain 61 passes to rotate the same and adjust the rods 54. The upper portion of the traveling band or belt 27 passes over a guide roller 62 on the shaft 41 that pivotally connects the two sections of the carrier frame. The lower portion of the belt passes under this roller and over a second guide roller 63 which is mounted upon the inner end of the carrier frame section 40. These rollers assist in holding the belt in position as the inner adjacent ends of the hinged sections are raised and lowered.

The belts or bands 26 and 27 are driven by means of ratchet wheels 64 and 65 mounted respectively upon the shafts 35 and 53, upon which the rollers 29 and 52 are mounted and which rollers serve to drive the belts or bands. The ratchet 64 is arranged to be engaged by a pivoted dog 66 upon the upper end of an arm or lever 67 which is pivotally mounted on the shaft 35.

A link 68 is pivotally and adjustably connected to the lower slotted end of the arm 67 and at its opposite end it is pivotally connected to the lower end of an arm or lever 69. This arm is pivoted at its upper end on the adjacent side frame 1 and is provided with a roller 70 (see Fig. 5) which is arranged to be engaged by an eccentric cam 71 on the end of the shaft 12. A spring 72 extends between the side frame and the lower end of the arm 69 and holds the roller thereon in engagement with the cam.

The ratchet 65 is operated by a dog 72 on an arm 73 pivotally mounted between its ends on the shaft 53. The lower end of this arm is connected to a link 74, the opposite end of which is adjustably and pivotally connected to the upper end of an intermediate arm 75 which is pivoted between its ends on the adjacent side frame 1. A link 77 connects the lower end of this arm to the upper end of the arm 67. By the mechanism described, the traveling carrier belts or bands 26 and 27 are simultaneously advanced step by step and preferably to uniform extents. The mechanism, as described, provides adjustments by which the desired advance movement may be given to the belts at each operation.

The mechanism for feeding the cakes to the depositing device comprises two sets of alternately arranged, relatively fixed and movable steps 78 and 79, which are preferably mounted upon the carrier frame section or bed 39. Both sets of steps oscillate with the frame section 39 about the shaft 44, as the inner end of the frame section is raised and lowered. The relatively movable steps are also reciprocated to move the cakes over the relatively fixed steps 78 and advance them toward the depositing device. The relatively fixed steps 78 are secured together, but are arranged with spaces between them for the reciprocating steps or feeders 79. The latter are bolted together and are connected by a link 80 to the upper end of an oscillating arm or lever 81 which is pivotally mounted upon the cross shaft 44. An eccentric rod 82 is adjustably connected to the lower slotted end of this arm and is provided at its forward end with a strap 83 which engages an eccentric 84 on the shaft 12. The lowermost step or feeding device 85 also reciprocates but is not bolted to the other reciprocating steps. This step is connected at its outer end by an adjusting link 86 to the lower end of an arm 87. The upper end of this arm is pivoted to the under side of the uppermost stationary step or platform 78[a], and is also connected by a link 88 to the bracket 80[a] on the series of reciprocating steps. By this mechanism the throw of the lowermost step 85 is nearly twice as great as that of the other reciprocating steps 79.

The operation of the machine is as follows: Cakes are placed in more or less indiscriminate fashion on the upper steps 78 and 79 of the feed mechanism, the tank 2 is filled with marshmallow or similar substance and power is applied to the main drive shafts 15 and 12. The movable steps 79 and the lowermost step 85 are reciprocated by the mechanism described and this action will cause the cakes to move forwardly down the steps, dropping from one to the other, and during this process they are arranged in rows. To more effectively arrange the cakes or the like in rows, one of the lower relatively fixed steps 78 is provided with a notched working edge forming a series of adjacent pockets 78[b], with pointed projections between the pockets, which not only serve to position any cake not yet in line, but also serve to space the cakes at proper distances apart. This is effected by the movable step below the pockets which, as it is drawn back, draws the cakes thereon into the pockets and thus alines and properly spaces the same. The portion of this step having the pockets 78[b] therein, is preferably removably connected to the main portion of the step by bolts 78[c], so that this portion of the step may be changed, as desired, to adapt the machine for cakes of different sizes. With this feeding means, the cakes are not broken or otherwise injured, and the cakes thereon are readily accessible so that the attendant can remove broken or imperfect cakes and can readily fill up any gaps which may occur in the rows. The lowermost step or feeder 85 by which the cakes are positioned on the conveyer band 27 is provided at its inner end with a section 89 which is detachably or removably secured thereto by clips 90. This end section is provided with a notched working edge forming a series of pockets 89[a] and with a plate 91 extending over the inner portions of the pocket. The cakes drop from the last relatively fixed step 78 onto the upper surface of the lowermost movable step or feeding device 85 which is directly above the carrier band 27. As this is drawn back, the row of cakes drops onto the upper surface of the traveling belt or band 27. At the next forward movement of the lowermost step 85, the cakes are properly positioned in the pockets 89[a] and are pushed over the surface of the band 27 and are alined and spaced thereon directly beneath the row of discharge orifices or nozzles 4 of the depositing mechanism when the latter and carrier band are inactive. During the forward movement of the feeding device 85 and the part 89 thereof, the plate 91 engages the edges of the cakes and holds them flat upon the carrier band. The measuring valve 3 and piston 6 then operate to deposit the marshmallow, frosting or the like upon the row of cakes. Just prior to the operation of the depositing device the feeder 85 is withdrawn from engagement with the row of cakes beneath the discharge orifices or nozzles 4. The section 89 containing the pockets 89[a] and the plate 5 of the depositing mechanism containing the discharge orifices 4 may be changed, as desired, to accommodate the machine for cakes of different sizes. When marshmallow or like substance is used it will be smeared if the cakes are moved directly forward after they have been coated. To avoid this, the carrier belt or band 27 is lowered as soon as the coating is placed on a row of cakes by means of the mechanism described connected to the inner hinged ends of the two frame sections of the carrier. While in lowered position, the carrier bands 27 and 26 and the coated cakes thereon are advanced one step by the operating mechanism therefor, and the hinged carrier frame is then replaced and a row of uncoated cakes is placed under the orifices of the depositing device by the set of feeding devices. At each forward movement of the intermittently operated carriers, a row of coated cakes is passed over the discharge end of the carrier 27 onto a drying board or tray 28 on the carrier 26. The cakes are thus fed accurately in rows to the depositing mechanism and after coating they are first lowered to prevent the smearing of the coating material and are then advanced to permit the placing of another row of cakes beneath the depositing device. The coated cakes are automatically placed upon drying boards or trays, upon which they are kept until the coating has hardened.

It is obvious that numerous changes may be made in the details set forth without departure from the essentials of the invention as defined in the claims.

I claim as my invention:—

1. In a machine of the character described, the combination with a depositing mechanism, of means for feeding cakes or the like to said depositing mechanism, comprising two sets of alternately arranged, superposed steps, each comprising a plurality of connected steps, and having a relatively reciprocating movement sufficient to project the cakes or the like from one set of steps to the other at each throw, and means for relatively shifting said sets of steps.

2. In a machine of the character described, the combination with a depositing mechanism having a row of orifices, of means for feeding cakes or the like in rows to said depositing mechanism, comprising two sets of superposed steps, the steps of the one set being arranged between the steps of the other set, and said sets having a relative reciprocating movement sufficient to project the cakes from one step to the next at each throw, one or more of said steps having means for spacing the cakes of each row and mechanism for relatively shifting said sets of feeding steps.

3. In a machine of the character described, the combination with a depositing mechanism, of mechanism for feeding cakes or the like in rows to said depositing mechanism, comprising a set of horizontal, relatively stationary steps, a set of horizontal reciprocating steps connected for unison movement and arranged between the steps of said relatively stationary set, and mechanism for reciprocating said relatively movable steps through a distance substantially equal to the space between the edges of two adjacent steps of said relatively stationary set to project the rows of cakes from one set of steps to the other at each throw, substantially as described.

4. In a machine of the character described, the combination with a depositing device, of a traveling carrier below said device, mechanism for feeding cakes or the like onto said carrier, said feed mechanism comprising two sets of alternately arranged superposed steps having a relative reciprocating movement sufficient to project the cakes from one step to the next at each throw, means for relatively reciprocating said sets of steps, and means for intermittently operating said traveling carrier to deliver the cakes from said depositing device.

5. In a machine of the character described, the combination with a depositing device having a row of orifices, of a traveling carrier band arranged below said depositing device, mechanism for feeding and positioning cakes or the like in rows onto said band and beneath the said row of orifices, said feed mechanism comprising two sets of alternately arranged superposed steps having a relative reciprocating movement sufficient to project the cakes from one step to the next at each throw, one or more of said steps having means for spacing the cakes of each row, means for operating said depositing device and said steps, and means for intermittently advancing said carrier band.

6. In a machine of the character described, the combination with a depositing device, of means for feeding cakes or the like in rows to said depositing device, said feeding mechanism comprising two sets of alternately arranged, relatively reciprocating steps, the inner ends of one or more of said steps having projections for engaging and spacing the cakes.

7. In a machine of the character described, the combination with a depositing device, of mechanism for feeding cakes to said depositing device comprising a series of alternately arranged superposed relatively reciprocating steps, and mechanism for relatively reciprocating said steps and for imparting a relatively greater throw to the lowermost step of the series.

8. In a machine of the character described, the combination with a depositing device having a row of discharge orifices, of means for feeding cakes or the like into position below said discharge orifices, said feeding mechanism comprising a series of alternately arranged relatively stationary and reciprocating steps, the inner operative ends of certain of said steps each having a series of pockets.

9. In a machine of the character described, the combination with a depositing device, of mechanism for feeding the cakes to said depositing device comprising a series of alternately arranged, superposed relatively fixed and movable steps, and mechanism for reciprocating said movable steps and for imparting a relatively greater throw to the lowermost step of the series.

10. In a machine of the character described, the combination with the depositing mechanism having a row of orifices, of a support below said orifices, means for raising and lowering said support, means for feeding the cakes or the like in rows onto said support and below said orifices, said feed mechanism comprising a series of alternately arranged, relatively fixed and movable steps, all of said steps being mounted upon and shifting with said support, and means for reciprocating said relatively movable steps.

11. In a machine of the character described, the combination with a depositing device having a series of orifices, of a traveling carrier and frame therefor arranged below said orifices, said carrier frame being pivotally mounted at its outer end, means for vertically shifting the inner portion of said carrier frame to and from said orifices and feed mechanism mounted on said shifting carrier frame comprising a series of alternately arranged, relatively fixed and reciprocating steps.

12. A machine of the character described comprising a depositing device and an endless traveling carrier band and frame therefor arranged below said depositing device, said frame consisting of two sections hinged together at their inner adjacent ends and pivotally supported at their outer ends, mechanism for vertically shifting the inner hinged ends of said sections to and from said depositing device and means for intermittently advancing said carrier band.

13. A machine of the character described comprising a depositing device and an endless traveling carrier band and frame therefor arranged below said depositing device, said carrier frame consisting of two longitudinal sections hinged together at their inner adjacent ends and pivotally supported at their outer ends, mechanism for vertically shifting the hinged inner ends of said sections to and from said depositing device, a second traveling carrier band for drying boards or the like arranged below the discharge end of said first mentioned carrier band and mechanism for intermittently advancing said carrier bands.

14. In a machine of the class described, the combination with a depositing device, of a carrier below said device comprising an endless carrier band and a carrier frame whereon said band is mounted, said frame being pivotally mounted at the outer discharge end of the carrier, mechanism for vertically shifting said pivoted carrier frame and band to and from said depositing device, a second carrier band and a fixed supporting frame arranged below the outer discharge end of said first-mentioned carrier, and mechanism for intermittently advancing said carrier bands, substantially as described.

15. A machine of the character described comprising a depositing device, a traveling band and frame therefor arranged below said depositing device, said carrier frame consisting of two longitudinal sections hinged together at their inner adjacent ends, the outer ends of said sections being pivotally supported, mechanism for raising and lowering the inner adjacent ends of said carrier frame sections, means for sustaining the discharge end of said carrier frame in a manner permitting the reciprocating movement thereof, feed mechanism for depositing cakes on said carrier band, a second traveling carrier band for supporting trays or the like arranged below the discharge end of said first mentioned carrier band and mechanism for operating said depositing device and for intermittently advancing said carrier bands.

16. In a machine of the character described, the combination with a depositing device having a row of orifices, of a traveling carrier band below said depositing device, mechanism for intermittently and alternately operating said depositing device and said carrier band, a feeding device for moving rows of cakes over the surface of said traveling carrier band, said feeding device having a working edge provided with a series of pockets for receiving the cakes, and mechanism for moving said feeding device to a point adjacent the orifices of said depositing device when the latter and said carrier band are inactive to thereby aline a row of cakes upon said traveling carrier band and beneath said orifices.

17. In a machine of the character described, the combination with a depositing mechanism having a row of orifices, an endless carrier below said orifices, and means for moving one of said parts vertically to and from the other, of a feeding device on the feed side of said depositing mechanism and having a notched working edge arranged to move the cakes over the surface of said carrier and aline the same in rows beneath said orifices, a second traveling carrier for drying boards or the like arranged below the discharge end of said first mentioned carrier, the latter having a narrow discharge end arranged to engage and deliver the cakes directly onto the drying boards on said second carrier, said narrow discharge end being free to rise and fall as the drying boards are passed beneath it, and mechanism for intermittently advancing said carriers.

18. In a machine of the character described, the combination with a depositing device, of an endless traveling carrier band and a pivoted frame therefor arranged below said device, said pivoted frame having a narrow discharge end free to rise and fall around which said carrier band passes, a roller at the opposite end of said pivoted frame, means for raising and lowering said frame and the carrier band toward and from the depositing device, a second traveling carrier for drying boards or the like arranged below the discharge end of said first mentioned carrier band, and mechanism for intermittently advancing said carrier bands.

19. A machine of the character described comprising a depositing device having a row of orifices, an endless traveling carrier band arranged below said depositing device, a supporting frame for said carrier band comprising two sections hinged together at their inner adjacent ends and pivotally supported at their outer ends, feed mechanism for moving cakes or the like over the surface of said carrier band and for alining the same beneath said row of orifices, means for raising and lowering the inner hinged ends of said frame sections to and from said row of orifices, a second traveling carrier for drying boards or the like arranged below the discharge end of said first mentioned carrier, the latter having a narrow discharge end free to rise and fall as the drying boards or the like are passed beneath it, and mechanism for intermittently advancing said carriers and for intermittently operating said depositing and feeding devices.

20. In a machine of the character described, the combination with a depositing device having a row of orifices, of a traveling carrier band below said depositing device, mechanism for intermittently and alternately operating said depositing device and said carrier band, a feeding device for advancing rows of cakes over the surface of said traveling carrier band in the direction of movement of the latter, said feeding device having a working edge provided with a series of pockets for receiving the cakes, mechanism for automatically moving said feeding device to a point adjacent the orifices of said depositing device when the latter and the said carrier band are inactive to thereby aline a row of cakes upon said band and beneath said orifices, mechanism for relatively shifting said carrier band and said depositing device in vertical direction, said carrier having a narrow, vertically movable, outer discharge end, and a second traveling carrier arranged beneath said outer discharge end.

21. In a machine of the character described, the combination with a depositing device having a row of orifices, of a traveling carrier and a supporting frame therefor below said orifices, a feeding device for moving rows of cakes upon the surface of said traveling carrier, said feeding device having a working edge provided with a series of pockets for receiving and spacing the cakes of each row and having a plate extending over the inner portions of said pockets, means for moving said feeding device to a point adjacent the orifices of the depositing device to aline a row of cakes beneath said orifices, and means for intermittently actuating said feeding device and depositing device and said carrier.

22. In a machine of the character described, the combination with a depositing device, of an endless traveling carrier band and a supporting frame therefor arranged below said depositing device, feed mechanism for positioning cakes or the like on said carrier band, a second carrier for drying boards or the like arranged below the outer discharge end of said first mentioned carrier, the latter having a narrow discharge end free to rise and fall as the drying boards are passed beneath it by said second carrier, means for counterbalancing the discharge end of said first mentioned carrier and mechanism for intermittently advancing said carriers.

23. In a machine of the character described, the combination with a depositing device, of an endless traveling carrier band and vertically movable supporting frame therefor arranged below said device and having a narrow, outer discharge end, a second traveling carrier for drying boards or the like arranged below the narrow discharge end of said first mentioned carrier, mechanism for automatically raising and lowering the inner portion of said carrier supporting frame to and from said depositing device, and means for manually raising and lowering the outer discharge end of said carrier frame to and from said second carrier.

24. In a machine of the character described, the combination with a depositing device, of an endless traveling carrier band, a supporting frame therefor arranged below said device and having a narrow, outer discharge end, a second traveling carrier for drying boards or the like arranged below the narrow discharge end of said first mentioned carrier, mechanism for automatically raising and lowering the inner portion of said first mentioned carrier and its supporting frame to and from said depositing device, and a manually shiftable support for its narrow discharge end having a pin-and-slot connection therewith, whereby said narrow discharge end is free to rise and fall as the drying boards are passed beneath it by said second carrier.

25. In a machine of the character described, the combination with a depositing device, of an endless traveling carrier band, a supporting frame therefor arranged below said device and having a narrow, outer discharge end, a second traveling carrier for drying boards or the like arranged below the narrow discharge end of said first mentioned carrier, mechanism for automatically raising and lowering the inner portion of said first mentioned carrier and its supporting frame to and from said depositing device, a swinging support for its narrow discharge end having a pin-and-slot connection therewith and a weight connected to said support for counterbalancing the discharge end of said first mentioned carrier.

26. In a machine for depositing marshmallow and like material on cakes, the combination with a depositing device having a row of nozzles and intermittently operating means for ejecting material from said nozzles, of an intermittently operating carrier band extending beneath said nozzles, means for feeding cakes in rows directly onto the upper horizontal reach of said band and for spacing the cakes of each row thereon comprising sets of alternately arranged relatively fixed and movable steps, certain of said steps having notched working edges for spacing the cakes, and mechanism for reciprocating said relatively movable steps.

27. In a machine for depositing marshmallow and like material on cakes, the combination with a depositing device having a row of nozzles and plunger mechanism for ejecting material from said nozzles, of an endless carrier band and a parallel supporting bed therefor extending beneath said depositing device, means for vertically shifting said supporting bed and said carrier band, means for alternately and intermittently operating said depositing device and said carrier band, and means for feeding and spacing cakes in rows upon the upper horizontal reach of said band above said supporting bed, said feeding means comprising relatively stationary and reciprocating steps certain of which are provided with notched working edges for spacing the cakes.

28. In a machine for depositing marshmallow and like material on cakes, the combination of a depositing device having a row of nozzles and plunger mechanism for ejecting the material from said nozzles, of an endless carrier band extending beneath said nozzles, means for intermittently and alternately operating said plunger mechanism and said carrier band, a cake feeder for moving cakes over and in contact with the upper horizontal surface of said carrier band, said feeder having its working edge notched to provide a series of adjacent pockets for receiving and spacing the cakes of each row upon said carrier band, and means for delivering the cakes in rows to said feeder comprising relatively stationary and reciprocating steps, the working edge of at least one of which is notched to provide a series of adjacent pockets for receiving and spacing the cakes of each row.

29. In a machine for depositing marshmallow and like material on cakes, the combination with a depositing device having a row of nozzles and plunger mechanism for ejecting material from said nozzles, of an endless carrier band extending beneath said nozzles, means for intermittently and alternately operating said depositing device and said carrier band, a cake feeder having a notched working edge arranged to move the cakes upon the upper horizontal surface of said carrier band and to space the same in rows thereon, and means for delivering cakes in rows to said feeder comprising a stationary step having a notched working edge, a subjacent reciprocating step arranged to draw the cakes against the notched edge of said stationary step on its back stroke and to advance the same on its forward stroke.

30. In a machine for depositing marshmallow and the like on cakes, the combination with a depositing device having a row of nozzles and plunger mechanism for ejecting material therefrom, of an endless carrier band and a parallel supporting bed therefor extending beneath said depositing device, a reciprocating feeder movably mounted on said supporting bed on the feed side of said depositing device and having a notched working edge arranged to move the cakes over the upper horizontal surface of said band and to space the same in rows thereon, an additional reciprocating feeder for delivering the cakes in rows to said first mentioned feeder, and actuating means for simultaneously reciprocating said feeders.

31. In a machine for depositing marshmallow and the like on cakes, the combination with a depositing device having a row of nozzles and plunger mechanism for ejecting material therefrom, of an endless carrier band and a parallel supporting bed therefor extending beneath said depositing device, a feeding device movably guided on said supporting bed and having a notched working edge for moving and spacing the cakes upon the upper horizontal surface of said band above said supporting bed, and means for moving said feeder to a point adjacent said nozzles when said depositing device and said carrier are inactive to thereby aline a row of cakes upon said carrier and below said nozzles.

32. In a machine for depositing marshmallow and like material on cakes, the combination with a depositing device having a row of nozzles and plunger mechanism for ejecting material from said nozzles, of an endless carrier band extending beneath said nozzles, means for intermittently and alternately operating said depositing device and said carrier band, a cake feeder on the feed side of said depositing device having a notched working edge for moving and spacing the cakes upon the upper horizontal surface of said carrier band, means for moving said feeder to a point adjacent the nozzles of said depositing device when the latter and said carrier band are inactive, to thereby aline a row of cakes upon said carrier band and beneath said orifices, an additional feeder for delivering cakes in rows to said first mentioned feeder and actuating means for reciprocating said feeders.

33. In a machine for depositing marshmallow and the like on cakes, the combination with a depositing device having a row of nozzles and plunger mechanism for ejecting material therefrom, of an endless carrier band and a parallel supporting bed therefor extending beneath said depositing device, means for raising and lowering said bed and carrier band, means for intermittently and alternately operating said depositing device and said carrier band, a reciprocating feeder movably mounted on said supporting bed on the feed side of said depositing device arranged to move the cakes upon the upper horizontal surface of said band above said supporting plate and to space the same in rows thereon, and an additional reciprocating feeder for delivering the cakes in rows to said first mentioned feeder.

34. In a machine for depositing marshmallow and the like on cakes, the combination with a depositing device having a row of nozzles and plunger mechanism for ejecting material therefrom, of an endless carrier band and a parallel, pivotally mounted supporting bed therefor extending beneath said depositing device, means for raising and lowering said pivoted bed and said carrier band, means for intermittently and alternately operating said depositing device and said carrier band, a feeding device movably guided on said pivoted supporting bed and having a notched working edge for moving and spacing the cakes upon the upper horizontal surface of said band above said supporting bed, means for moving said feeder to a point adjacent said nozzles when said depositing device and said carrier are inactive to thereby aline a row of cakes upon said carrier and beneath said depending nozzles.

35. In a machine for depositing marshmallow and the like on cakes, the combination with a depositing device having a row of nozzles and plunger mechanism for ejecting material therefrom, of a buckling carrier band, a flat, pivotally mounted, supporting bed therefor extending beneath said depositing device, means for raising and lowering said pivoted bed, a feeding device movably mounted on said pivoted supporting bed arranged to move the cakes over the upper horizontal surface of said band above said supporting bed and to space the same in rows thereon, a second carrier for drying boards extending beneath the said buckling carrier, the latter having a narrow discharge end arranged to deliver the cakes onto the drying boards on said second carrier.

36. In a machine for depositing marshmallow and the like on cakes, the combination with a depositing device having a row of nozzles and plunger mechanism for ejecting material therefrom, of a buckling carrier band, a flat supporting bed therefor extending beneath said depositing device, means for raising and lowering said bed and said carrier, a reciprocating feeder movably mounted on said supporting bed on the feed side of said depositing device and having a notched working edge arranged to move the cakes over the upper horizontal surface of said band above said bed and space the same in rows thereon, means for moving said feeder to a point adjacent said nozzles of said depositing device when the latter and said carrier are inactive to thereby aline a row of cakes upon said carrier and beneath said nozzles, a second carrier for drying boards, said buckling carrier having a narrow discharge end arranged to deliver the cakes onto said drying boards.

37. In a machine for depositing marshmallow and like material on cakes, the combination with a depositing device having a row of nozzles and plunger mechanism for ejecting material therefrom, of a buckling carrier band having a substantially horizontal upper reach, a flat supporting bed therefor pivotally mounted on the feed side of said depositing device and extending beneath the same, means for raising and lowering said bed and carrier to position the cakes adjacent but spaced from said nozzles, a reciprocated feeder movably guided on said bed for moving and alining the cakes in rows upon said carrier band, and a second carrier for drying boards upwardly inclined below the discharge end of said buckling carrier, the latter having a narrow discharge end arranged to deliver the cakes directly onto the drying boards on said second carrier.

38. In a machine for depositing marshmallow and like material on cakes, the combination with a depositing device having a row of nozzles and plunger mechanism for ejecting material from said nozzles, of an endless carrier band extending beneath said nozzles, means for intermittently and alternately operating said plunger mechanism and said carrier band, a cake feeder on the feed side of said depositing device having a notched working edge for moving the cakes in rows over and in contact with the upper horizontal surface of said carrier band and for spacing the cakes of each row thereon, additional feeding means for delivering the cakes in rows to said feeder comprising relatively stationary and reciprocating steps, and means for operating said feeder and said additional feeding means in timed relation.

39. In a machine for depositing marshmallow and the like on cakes, the combination with a depositing device having a row of nozzles and plunger mechanism for ejecting material therefrom, of a buckling carrier band extending beneath said depositing device and supported at its ends and having a narrow discharge end, a feeding device upon the feed side of said depositing device for moving the cakes in rows over and in contact with the upper surface of said carrier band, said feeding device having its working edge notched to provide a series of adjacent pockets for receiving and spacing the cakes of each row upon said carrier band, means for raising and lowering said buckling carrier band to position the rows of cakes thereon adjacent but out of contact with said nozzles, and a second carrier for drying boards or the like extending beneath the narrow discharge end of said buckling carrier band.

40. In a machine for depositing marshmallow and the like on cakes, the combination with a depositing device having a row of nozzles and plunger mechanism for ejecting material therefrom, of an endless buckling carrier band and a parallel supporting bed therefor extending beneath said depositing device, means for raising and lowering said bed and said carrier band to position the cakes thereon adjacent but out of contact with said nozzles, means for intermittently and alternately operating said plunger mechanism and said carrier band, a feeding device on the feed side of said depositing device and having a notched working edge for moving the cakes in rows over and in contact with the upper surface of said band and for spacing the cakes of each row thereon, an additional feeding means for delivering the cakes in rows to said first mentioned feeder, and means for operating the latter and said additional feeding means in timed relation.

41. In a machine for depositing marshmallow and like material on cakes, the combination with a depositing device having a row of nozzles and plunger mechanism for ejecting the material therefrom, of an endless carrier band and parallel supporting bed therefor extending beneath said depositing device, means for raising and lowering said bed and said carrier band to position the cakes thereon adjacent but out of contact with said nozzles, means for intermittently and alternately operating said plunger mechanism and advancing said carrier band, a reciprocating feeder on the feed side of said depositing device for moving the cakes in rows over and in contact with the upper horizontal surface of said carrier band, said feeder having its working edge notched to provide a series of adjacent pockets for receiving and spacing the cakes of each row, and means for advancing said feeder to thereby aline a row of cakes upon said carrier band when the latter is inactive.

42. In a machine for depositing marshmallow and the like on cakes, the combination with a depositing device having a row of nozzles and plunger mechanism for ejecting material therefrom, of a buckling carrier band supported at its ends and having a narrow discharge end, means for raising and lowering said buckling carrier band to position the cakes thereon adjacent but out of contact with said nozzles, means for intermittently and alternately operating said plunger mechanism and said carrier band, a reciprocating feeding device on the feed side of said depositing device for moving the cakes in rows over and in contact with the upper surface of said carrier band, said feeding device having its working edge notched to provide a series of adjacent pockets for receiving and spacing the cakes of each row upon said carrier band, means for advancing said feeding device to aline a row of cakes upon said band when the latter is inactive, additional feeding means operating in timed relation with said feeding device for delivering the cakes in rows thereto, and a second carrier band for drying boards and the like arranged beneath the discharge end of said first mentioned carrier.

FREDERICK WESTERMAN.